July 15, 1952 W. W. CUSHMAN 2,603,318
PANEL FASTENER
Filed Nov. 18, 1947
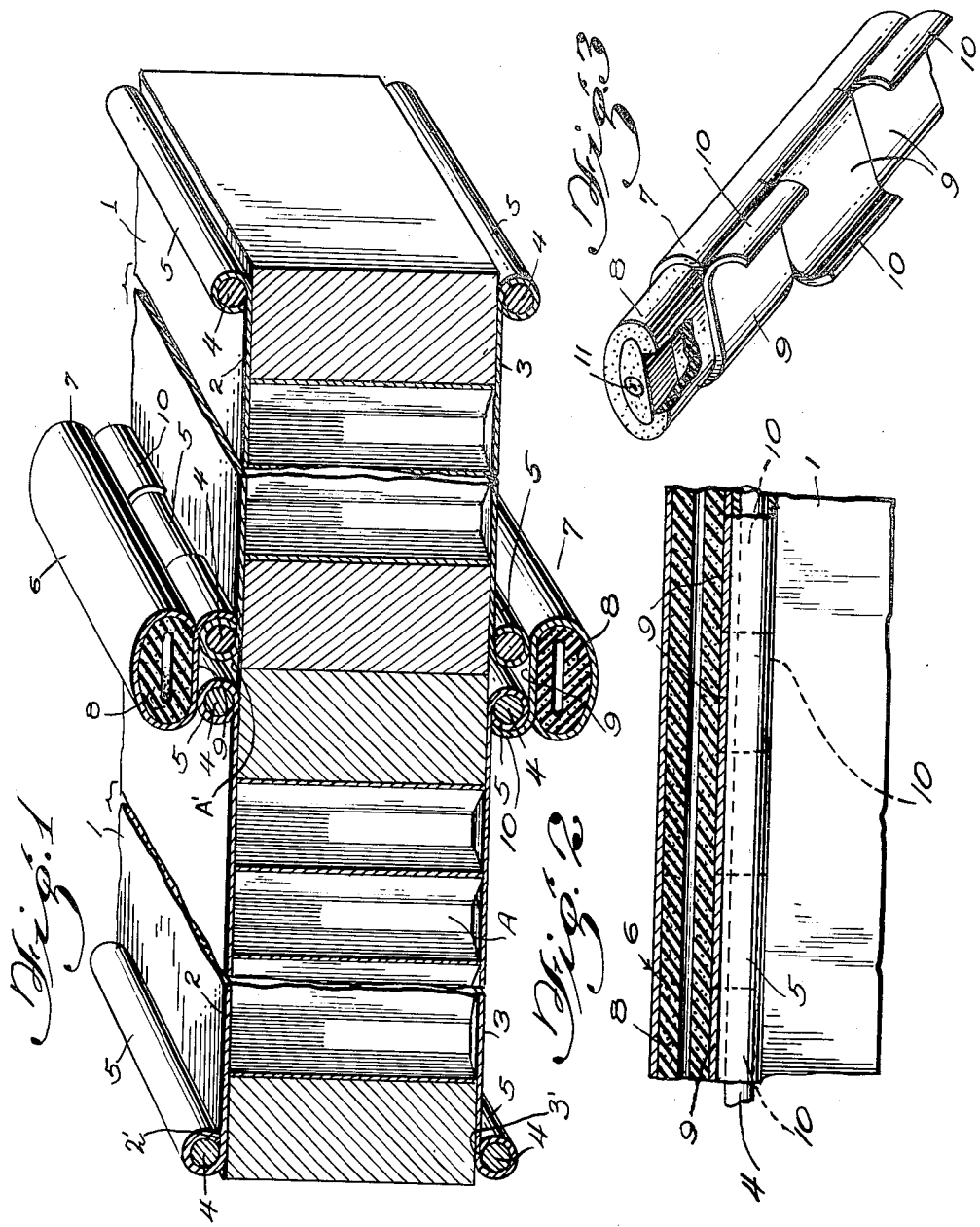
INVENTOR.
Walton W. Cushman
BY
W. J. Eccleston,
ATTORNEY Patented July 15, 1952

2,603,318

UNITED STATES PATENT OFFICE 2,603,318

PANEL FASTENER

Walton W. Cushman, Webb City, Mo.

Application November 18, 1947, Serial No. 786,595

1 Claim. (Cl. 189—36)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to means for uniting the adjoining edges of portable and knockdown panels and while intended primarily for military use, such as in the assembling of shelters, it will be readily apparent that the invention may be incorporated in other types of buildings, refrigerator casings, etc.

A primary object of the invention is to provide a joint for light-weight panels so that the load is spread or distributed throughout the edge of the panel thereby avoiding excessive strain at any particular point.

A further object of the invention resides in devising a joint for panels which will require only a minimum use of tools in uniting the panel edges.

It is also an object of the invention to provide a joint which will require no finger dexterity in its installation thus rendering it highly useful in extremely cold climates.

Another object of the invention consists in the formation of a joint which is of light weight and at the same time moistureproof and air tight.

A still further object of the invention consists in the provision of a joint for building panels and the like which will require no supporting frame and which will serve to automatically align the panels when the joint is tightened.

Another object of the invention resides in the provision of a pneumatically operated spring clamp for securely and firmly connecting adjacent panels in proper alignment.

Other objects and advantages of the invention will be apparent from the following description when taken in connection with the accompanying drawings, in which Figure 1 is a fragmentary perspective view of a pair of panels arranged in alignment with the novel panel fastening means applied thereto.

Figure 2 is a fragmentary sectional view through the panel fastening means; and

Figure 3 is a fragmentary perspective view of the fastening means apart from the panels to which it is to be applied.

Referring to the drawings in greater detail, the panels to be united are indicated by the numeral 1 and are of substantially the same construction as those shown in my co-pending application Ser. No. 752,792, filed on June 5, 1947, and entitled Panel Fastening Means. These panels in general comprise spaced-apart metal plates or sheets 2 and 3 between which is interposed a cellular structure A of any preferred construction. The abutting ends of the panels are indicated by the reference character A', and the edges of the plates 2 and 3 are indicated by the reference characters 2' and 3'.

In the present form of the invention the adjoining edges of the panels are formed with lateral projections and as disclosed herein these projections are formed by rolling back the edges of the metal sheets 2 and 3 upon wire strips or the like 4 thereby providing elongated beads 5 spaced rearwardly of the panel ends A' and extending throughout the width of the panels and which are adapted to be engaged by a pneumatically operated spring clamp so that the panels will be drawn tightly together and maintained in proper alignment.

The clamp, which is generally indicated by the numeral 6 may be composed of an elongated strip of metal bent upon itself to provide a loop portion 7 adapted to receive a rubber tube or the like 8 which is intended to be inflated as hereinafter described. The metal strip 6 prior to being bent into form is cut along its opposed edges to provide a plurality of staggered arms 9 which are bent at their free ends to provide curved fingers or gripping elements 10. When the strip is bent upon itself to provide the loop 7 the opposed arms 9 are brought into crossed relationship as clearly shown in Figures 1 and 3 thereby positioning the fingers or grippers 10 in opposed relationship to cooperate with the beads 5 on the ends of the panels.

The clamp, as finally produced, is of spring metal and it will be apparent that by manually compressing the sides of the loop 7 the opposed fingers 10 may be spread apart so as to permit them to be engaged over the adjoining beads 5 of adjacent panels. When pressure upon the loop 7 is released the fingers 10 will automatically engage over the beads 5 to more or less tightly draw the panels 1 together. Final gripping of the panels so as to provide water-tight and air-tight contact between their adjoining edges is provided by means of the inflatable tube 8 which is mounted on the interior of the loop 7. This tube is provided with any suitable type of valve 11, such as indicated in my co-pending application referred to above, and by inflating the tube it will be obvious that its expanding walls will spread the side walls of the loop 7 apart so as to force the opposed fingers 10 toward each other thereby applying the amount of force necessary to produce the tight joint desired.

From the foregoing description and the attached drawings it will be apparent to those skilled in the art that the present panel joint is one that may be readily installed without the use of tools; that it insures the automatic alignment of the panels; that the use of the conventional framework is eliminated; that the clamp provides for an equal distribution of the load and strain throughout the edges of the panels; and that it generally improves structures of this type.

While the present panel fastener has been described in considerable detail it will be obvious that various minor changes may be made within the scope of the appended claim.

I claim:

A panel joint comprising a pair of panels positioned in abutting end-to-end relationship, each formed of spaced metal sheets and interposed cellular structure material, the edges of the metal sheets, at the abutting ends of the panels being curved backwardly and forming elongated cylindrical beads on the panels spaced rearwardly of the abutting ends of the panels, clamps drawing and holding said panel ends in abutting relationship, each clamp comprising a strip of metal or the like bent to form a loop with crossed arms projecting from the edges thereof and provided with fingers engaging the exterior cylindrical surfaces of said beads, and inflatable tubes enclosed within the loop portions of the clamps for expanding the same and drawing the panels tightly together.

WALTON W. CUSHMAN.

REFERENCES CITED

The following references are of record in the file of this patent:

UNITED STATES PATENTS

| Number | Name | Date |
| --- | --- | --- |
| 1,959,766 | Sayler | May 22, 1934 |
| 2,193,994 | Weaver | Mar. 19, 1940 |
| 2,192,287 | Ladon | Apr. 23, 1940 |
| 2,382,958 | Burgoine | Aug. 21, 1945 |
| 2,460,853 | Siple | Feb. 8, 1949 |